United States Patent Office 3,546,076
Patented Dec. 8, 1970

3,546,076
METHOD OF PRODUCING METALLURGICAL COKE
Nathan William Muller, Clarendon Hills, Ill., and Anton R. Novy and Frederick L. Shea, Jr., Johnson City, Tenn., assignors to Great Lakes Carbon Corporation, New York, N.Y., a corporation of Delaware
Continuation of application Ser. No. 641,087, Apr. 12, 1967, which is a continuation-in-part of application Ser. No. 449,829, Apr. 21, 1965. This application July 16, 1969, Ser. No. 847,504
Int. Cl. C10b 57/04
U.S. Cl. 201—6                        13 Claims

ABSTRACT OF THE DISCLOSURE

The process comprises heating selected carbonaceous particles to a suitable temperature between 300° C. and 525° C.; compressing the heated particles while they are still hot into green bodies of desired shape and specified maximum porosity and minimum density; and carbonizing the formed green bodies while they are still hot, employing a controlled carbonization process. Care is taken to avoid any substantial amount of oxidation of the particles and/or of the formed green bodies during most of the aforesaid heating, pressing and carbonizing steps, particularly while the particles or bodies are at substantially elevated temperatures.

CROSS-REFERENCE TO RELATED APPLICATIONS

This application is a streamlined continuation application under Commissioner's Order 824 O.G. 1, of parent application Ser. No. 641,087, filed Apr. 12, 1967 which, in turn, is a continuation-in-part of application Ser. No. 449,829, filed Apr. 21, 1965, both now abandoned.

BACKGROUND OF THE INVENTION

Field of the invention

This invention relates to a novel process for producing coke suitable for use in cupolas, blast furnaces and other metallurgical operations.

Description of the prior art

Typically the prior art cokes suitable for the above purposes have been produced in by-product coking ovens by coking a blend of high and low volatile bituminous coals, or by coking a blend of such coals along with other suitable ingredients such as pitch and anthracite; the types, number and amounts of the components having been selected according to the ultimate properties desired in the coke. The size and strength of the coked product has been non-uniform—so that some of the product has been of desired size and strength; some has been of the desired size but of inferior strength as indicated by poor shatter and tumbler values; some has been undersize, etc. Such variations make good cupola operation difficult, particularly where large volume production is concerned or where close limits in metal composition and temperature are necessary, such as when castings are being made for critical applications.

SUMMARY OF THE INVENTION

It is an object of the present invention to produce a metallurgical coke by a technique completely different from the aforedescribed conventional coking operation carried out in by-product coking ovens.

It is another object of this invention to produce coke of substantially uniform size and strength and all of which is suitable for metallurgical purposes, as contrasted with coke normally produced in a by-product oven which is characterized by an appreciable amount of undersize material.

It is an additional object of this invention to produce coke which possesses porosity and density characteristics which are closely controlled, and which can also be very low in ash content. Such cokes are well suited for use in the phosphorus and calcium carbide industries as a reductant, and as a carbonaceous aggregate in the production of Soderberg anodes or pre-baked anodes for the aluminum industry.

It is yet another object of this invention to produce coke in a period of time which is substantially shorter than the times employed to produce coke by conventional by-product coking oven techniques, which typically require about 18–24 hours.

It is still another object of this invention to produce coke by a process which is substantially continuous in nature and which typically requires less manpower and maintenance costs than are required by the "by-product oven" coking techniques, which may be referred to as a "multiple batch" process.

The process in a preferred embodiment, comprises producing metallurgical coke from two main active particulate carbonaceous ingredients, viz coal and a raw uncalcined coke made by coking a heavy liquefiable hydrocarbon to a volatile matter content exclusive of water of about 8% to about 20%, e.g. raw petroleum coke. Minor amounts (up to about 25% by weight, of the total blend of active materials) of inert (essentially non-fusible during the coking process) materials such as anthracite, or coke breeze, or calcined petroleum coke, or poorly fusing or oxidized raw petroleum coke, or ores to be reduced in subsequent use of the coke may also be included in the formulation. In a less preferred embodiment, the final coke may sometimes also be prepared from raw uncalcined coke as the only active starting material.

In summarized form, the process comprises: heating the selected carbonaceous particles to a suitable temperature between 300° C. and 525° C.; compressing them while they are still hot into green bodies of desired shape having a maximum porosity of 37% and a minimum density of 0.85 g./cc.; and then carbonizing the formed green bodies while they are still hot, employing a controlled carbonization process. The particles are heated while maintaining them in a substantially unagglomerated state or in a relatively thin stream such as on a vibrating tray. If two or more particulate ingredients are employed in the making of the briquets, they may first be blended and then heated in a manner as just discussed. Or they may be separately heated before being blended. In either case the blended particulate ingredients are maintained in a substantially unagglomerated state or in a relatively thin stream before being compressed. If separate heating of the ingredients is employed, the different ingredients may advantageously be heated to different temperatures before being blended and more is stated regarding this hereinafter. As aforesaid, the process will generally and preferably be carried out using as the active particulate starting material a blend of coal and raw uncalcined coke, 100 parts of blend in proportions of 95 to 10 parts of the raw uncalcined coke and 5 to 90 parts of the coal.

The starting raw uncalcined coke is preferably of the "delayed coker" type made by coking a heavy, liquefiable petroleum hydrocarbon to a volatile matter (VM) content exclusive of water of from about 8% to about 20%, and more typically from about 11% to about 16%; it is preferred, also, that it be able to form a "button," as this property is defined hereinafter in connection with the volatile matter content test. If raw uncalcined coke is employed as the only active starting material, it must be of the "buttoning" type and must also possess a minimum VM content of about 10%. Its VM content may be as low as 8% when used in admixture with coal.

The coal has a volatile matter content of from about 15% to about 45% and may cover the low, medium and high volatile coal range; if the coal has a VM content exceeding about 20% and is used as the major active particulate starting material, it may be necessary to subject the starting coal to an initial or preliminary partial devolatilization step before it is used in the process and this is discussed in more detail hereinafter.

Other objects, and coincident advantages, and a complete understanding of the invention will be apparent to those skilled in the art after a study of the drawings, and a reading of the specification and claims.

BRIEF DESCRIPTION OF THE DRAWINGS

It has been found that the foregoing objects and advantages are achievable by carrying out the process set forth in block or outline form in the accompanying drawings of FIGS. 1 and 3, or in the schematic drawing of FIG. 2.

DETAILED DESCRIPTION OF THE DRAWINGS AND OF THE PREFERRED EMBODIMENTS

Figure 1:
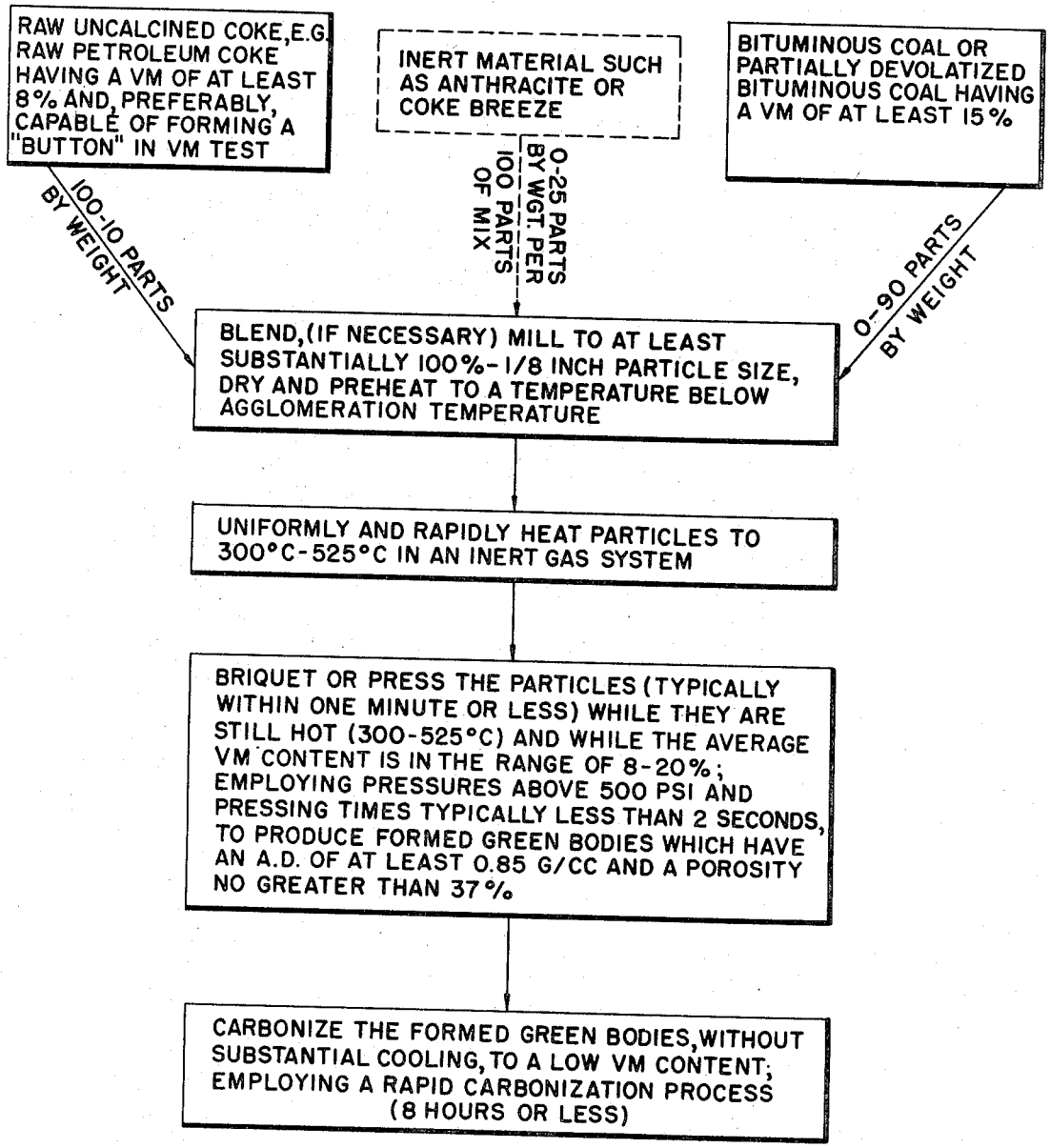
Figure 2:
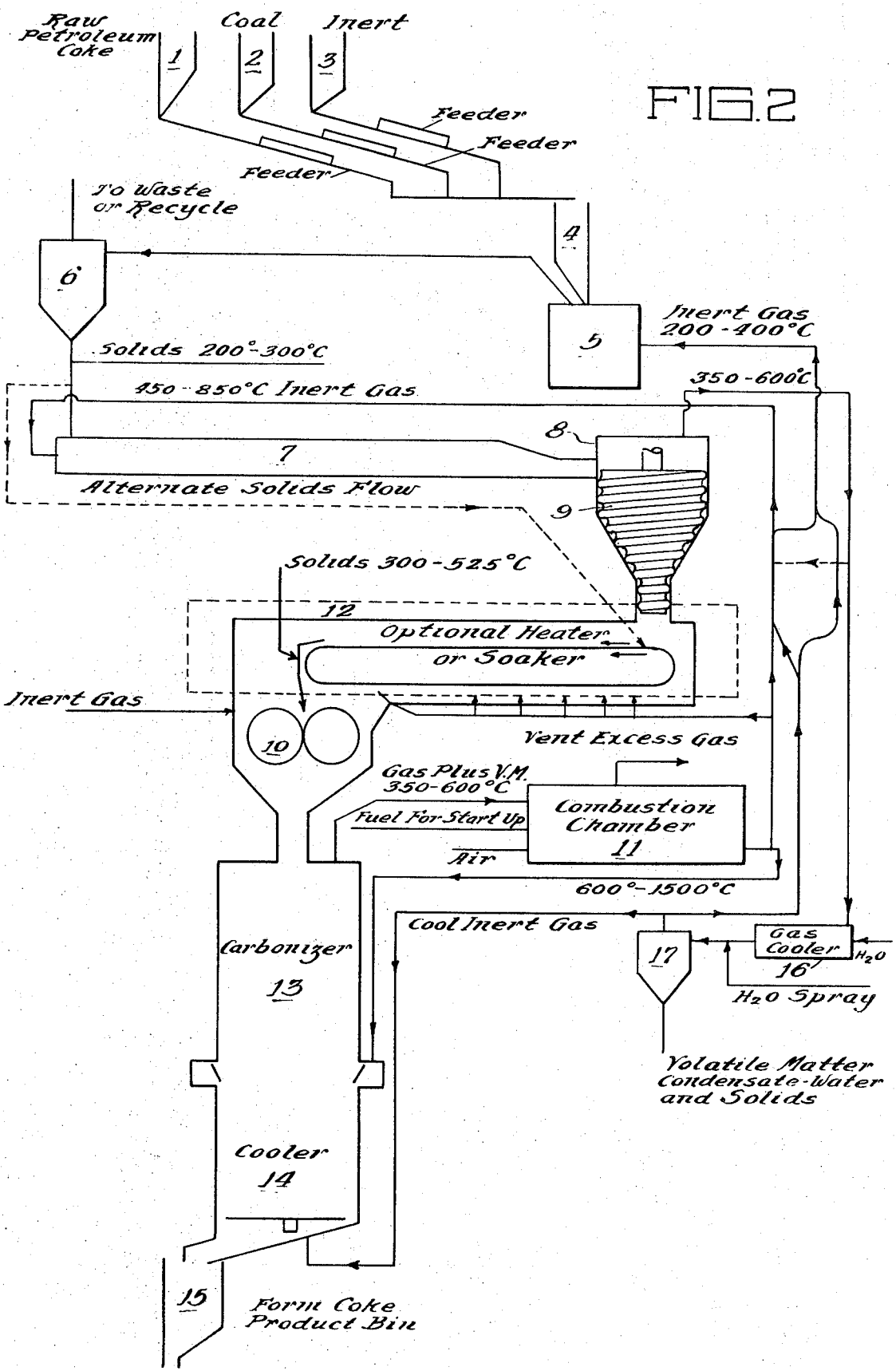

As illustrated in FIG. 2, which is a schematic representation of the process variation illustrated in the flowsheet of FIG. 1, the starting material(s) typically are stored in separate hoppers 1, 2 and 3 and blended in a desired proportion by means of controlled feeders. The materials in these hoppers may be de-watered or partially dried if necessary. This mixture typically is fed to a bin 4 prior to entering a pulverizer system. In the pulverizer or mill 5 the starting material(s) or mixture is crushed, milled or ground (additionally mixed) and preheated to a typical particle size of substantially 100% minus ⅛ inch if the particles are not already this size; however, they may be coarser or finer than this, or screened so as to restrict or control the size of the particles used in the subsequent steps of the process. However, particle sizing exceedingly fine, for example 100% minus 325 mesh (or even as fine as 50% minus 200 mesh) is generally avoided because unnecessary for optimum results and unduly expensive; that is, it accomplishes nothing extra, adds to the processing costs, and can result in formed bodies which are undesirably "dusty."

The starting materials are typically and preferably preheated in pulverizer 5, while being mixed and milled, to a conditioning temperature below that at which they readily agglomerate, such as to a temperature less than 300° C., or frequently between about 230° and 280° C. The mill 5 may be heated to the desired temperature by means of hot, essentially inert gases. The pre-heated particles are separated from the hot gases in cyclone-collector 6. As much time as is convenient (rapidly or slowly, as desired, or as best suited to process rates or the equipment available) may be taken to reach this initial pre-heat temperature, since the particles are still substantially non-fusing at this point. The particles may also be pre-heated in many other ways, recognizing that care must be taken to avoid significant oxidation, utilizing a substantially inert gas system where necessary.

The pre-heated particles from cyclone-collector 6 are then typically dispersed, conveyed and heated by means of a hot inert gas stream in duct 7 which provides sufficient retention time for the particles to reach the desired temperature, after which they are separated from the gases in an insulated cyclone 8. The cyclone-collector 8 is equipped with a motor-driven screw-conveyor 9 or scraper system which removes the particles from the cyclone. It is apparent that as the particles are in the "plastic" range, there is some tendency for them to accumulate on the walls of the collector cyclone. The screw-conveyor scraper system serves to continuously remove them. The cyclone separator 8 may be used either alone, or, as illustrated in FIG. 2, in conjunction with a motor-driven screw type apparatus 9 within the cyclone, so designed as to maintain a small or dilute load of the particles in the screw so that there is a relatively low weight of particles and a large amount of free space in the screw while the particles are conveyed to a forming apparatus 10, which typically is a roll briquetting press. Such a separator may be a cylindrically shaped apparatus and having a rotating screw which conveys the material from the apparatus.

It should be pointed out that the "pre-heating" step is a "conditioning" step in the sense that the particles are heated substantially above their initial temperature, but to a temperature below the critical "agglomerating" temperature range to which they are heated in the heater duct 7, which range, broadly, is between about 300° and about 525° C., and more typically, is between about 325° and about 470° C., this temperature varying depending upon the particular starting materials employed and their proportions and characteristics, e.g. such as the VM of the coal, whether the petroleum coke is of the "buttoning" type, the length of time of the particles at the pre-heating temperatures, etc. Although not absolutely essential, the use of such a "conditioning" step is very advantageous. For example, if all of the heating of the particles were carried out in one unit, the heating duct 7 and the collector cyclone 8 would have to be fairly large and expensively designed to heat the particles over the increased temperature gradient and avoid the danger of premature agglomeration. By using a pre-heating step, the "critical" temperature ranges are not merged with the "non-critical," and, therefore, the pre-heating unit can be simple because there is no danger of agglomeration; and the "critical" heater equipment can be reduced in size and better and less expensively designed to carry out its narrower phase of the process. This results in a more sharply and easily controlled process, increased efficiencies and a substantial reduction in equipment capital investment. It also enables a very rapid time in heating the particles to their agglomerating temperature because of the reduced temperature gradient involved. This means also that higher temperatures can be more easily attained.

As just indicated, whichever pre-heating type arrangement is employed, the particles must still be heated considerably beyond this pre-heat temperature before they are pressure formed, in order that they carry out their function in the process. Within broad ranges, they are rapidly heated to a temperature between about 300° C. and about 525° C., and more typically, to a temperature between about 325° C. and about 470° C. By "rapidly" is meant that the particles are raised to a temperature within these ranges within a maximum period of less than about 5 minutes—more typically within a maximum period of 1–2 minutes—and preferably within a period of less than 40 seconds. (It should be pointed out that if it is desired to use a coal having a volatile content higher than about 20%, i.e., bituminous coals having a volatile content of upwards to about 45% in the present process, then it is the practice of this invention to partially devolatilize such coals by any suitable means known to those skilled in the art, so that the resultant blend will have a volatile content no higher than about 20% by weight. If this operation results in excessive agglomeration of the coal, it may be preliminarily crushed to reduce it to a reasonable size, after which it can then be used as a raw material in the present process. The "bituminous coal" referred to in the claims, therefore, refers to coal in either its initial condition or in its partially devolatilized condition.)

During the aforesaid higher-temperature heating step the particles are heated to a point such that the total blend has an average overall volatile matter content between about 8 and about 20%. The particles are also all "uniformly" heated. In other words, all of the materials in the blend are heated substantially to the same temperature. In the process of doing this, however, the various ingredient(s) will be affected differently. For example, if a substantially inert material such as anthracite is used, it will typically merely be heated up to operating temperatures, with no loss of volatile matter. The time and/or temperature the particles are kept in or heated to in this heating step also depends upon a number of factors in addition to those already discussed. For example, if the material being heated is 100% raw petroleum coke having a volatile matter (VM) content of about 12%, the conditions are different than if it were 100% raw petroleum coke with a VW of 15%, or 18%, etc. If petroleum coke of 8 or 9% VM content is employed, it will not be used alone and will typically be used in conjunction with substantial amounts of coal. It is apparent also that the conditions may vary for such systems as the following, all of which are embraced within the invention and within the block diagram depicted in FIG. 1:

|   | Petroleum coke | | Bituminous coal | |
|---|---|---|---|---|
|   | Parts | VM percent | Parts | VM percent |
| a | 90 | 13 | 10 | 45 |
| b | 90 | 13 | 10 | 20 |
| c | 50 | 20 | 50 | 40 |
| d | 50 | 9 | 50 | 17 |
| e | 20 | 15 | 80 | 30 |
| f | 20 | 11 | 80 | 25 |
| g | 20 | 9 | 80 | 45 |

In the foregoing Examples c, e, f and g, the bituminous coal was partially devolatilized prior to blending (in order that the VM content of the coal-petroleum coke mixtures would not exceed about 20%) before it was blended with the petroleum coke and processed in accordance with the steps of this invention. In all cases in the higher-temperature heating step, the particles will be heated long enough (within the time ranges previously set forth) and/or to a sufficiently high temperature (also within the previously discussed temperature ranges) to bring the average volatile matter content of the heated particles or blends to between about 8 and about 20%, but so long and/or to such high temperatures that an undesirable amount of devolatilization takes place.

The means employed to carry out the type of heating which will accomplish the foregoing must satisfy several requisites. It must be capable of providing or maintaining a substantially inert atmosphere or a substantially inert gas system to prevent excessive oxidation. It must simultaneously convey or otherwise heat the particles while maintaining them in a relatively unagglomerated and preferably dilute system such as in a hot gas stream as aforedescribed or in a thin stream or bed on a moving grate or belt. It should permit no excessive agglomeration to occur between the particles. It must not possess "dead areas" where some particles are heated for longer periods of time or to higher temperatures than the general stream of particles. Conversely the means should permit few, if any, of the particles to be processed or conveyed so rapidly that they are not properly or sufficiently heated. The particles themselves should not be overheated or underheated because, if they are, this will adversely affect the remaining part of the process and result in poorly bonded "green" bodies, or carbonized bodies of poor strength, etc.

The means or apparatuses which may be employed to accomplish the foregoing heating step are several. The particles may be carried in a heated, inert gas stream or carrier gas in a suitably insulated metal or ceramic pipe or chamber, such as duct 7, the particles being heated by the hot inert gases obtained from a combustion furnace 11. As shown in FIG. 2, the inert gas may optionally (and preferably) be heated by combustion of the volatiles driven off during the calcination of the articles produced in the forming apparatus 10.

Another means for heating the particles in the desired manner and for maintaining them in a thin stream or in suitably thin layers or in a substantially unagglomerated state comprises heating them in an inert atmosphere in a heat soaker 12 such as a vibrating tray, or a moving grate or belt. Such a means may be used in combination with the heating duct 7-cyclone separator 8 arrangement or (as indicated by the dotted lines in FIG. 2) as a substitute therefor.

Other apparatus or methods may also be employed, so long as they are capable of rapidly, continuously and uniformly heating the particles while avoiding undue oxidation and agglomeration, and such possible variations will be discussed hereinafter in connection with FIG. 3.

Whichever type of heating method, or heating apparatus or means is employed, after the particles are raised to the desired temperature (between about 300° and 525° C., preferably between about 325° C. and about 470° C.), and while they are at approximately the same temperature to which they have been heated, they are substantially immediately press-formed. As indicated previously, they can be fed directly from the heating apparatus and formed continuously, such as by a roll-briquetting machine.

The forming apparatus 10 or rolls of the briquetting machine may be at any desired temperature, such as at the same temperature as the particles, or at room temperature, or at a temperature intermediate of these, etc. The briquetting rolls may be water cooled, or oil cooled, etc. It is apparent that the heated solids prior to briquetting must be protected from undue atmospheric oxidation which is detrimental to the strength of the finished product. A substantially inert gas atmosphere is provided. It is also apparent that in the presence of excess air there is danger of ignition and combustion.

The pressure employed in the forming step is variable depending on the temperature of the particles being formed, the formulation being processed, the type of press used, etc. In a piston press, it will be between about 500 and about 15,000 p.s.i., employing lower pressures with higher temperatures and vice versa. For example, particle temperatures of 300–400 C. and pressures of 1000 to 2000 p.s.i. may result in poor green and/or baked body strengths, whereas particle temperatures of 450–500° C. and pressures of 500 p.s.i. can result in bodies of good strength. No more pressure will generally be employed than will produce a formed green body having a porosity of at least 8%, while, on the other hand, at least as much pressure is employed so as to produce a green body having a porosity no greater than 37%. In other words, if the porosity of the formed green body is under 8% or is higher than 37%, or is not at a satisfactory level, whatever is desired, then the pressure employed may be reduced or increased accordingly until the porosity of the resultant green bodies is at the desired level. Green body porosities between about 15% and about 30% are more typical and preferred.

A roll-press is most preferred for volume production and when such a forming apparatus is employed the "pressing time" (the time when the particles being shaped are actually under pressure or when pressure is actually applied) is usually less than two seconds and typically less than one. Other forming apparatus can be employed, such as an extruder.

In piston presses, pressures less than 2500 p.s.i. are most typical and, generally, pressures higher than this are wasteful of energy. However, pressures above this and also above 4000 p.s.i. may sometimes be used or desirable, particularly when the carbonaceous particles being processed are 100% raw coke or when significant amounts of "inerts" have been added to the mixture to be processed. Higher pressures are used in roll presses, such as between about 4000 and about 90,000 p.s.i.

A minimum porosity of at least 8% is generally maintained in the formed green body in order that a minimum of problems arise in the forming and baking steps and in order that the baking steps may be carried out in a rapid operation. If the porosity of the formed bodies is too low and attempts are made to rapidly carbonize such bodies, then the escaping remaining volatiles tend to rupture the articles and produce coke of unsuitable size or strength for metallurgical purposes.

Changing the temperature to which the particles are heated, or making changes in the formulation which is employed to make the green bodies also, of course, affect the porosity of the bodies produced. As aforesaid, the maximum porosity of the formed green bodies is 37%. If higher than this, then they are too weak or have too low an apparent density (after being carbonized) for their contemplated uses. The apparent density of the carbonized product is generally between about 1.0 and 1.5 g./cc. With regard to the apparent density of the formed green bodies, this should be above 0.85 g./cc., and is typically between about 0.9 and 1.25 g./cc.; of course the lower density bodies have the higher porosity and the higher density green bodies have the lower porosity.

After the particles are pressure-formed, the formed "green" bodies are also substantially immediately carbonized, without substantial cooling. In other words, even though the pressure forming apparatus may be at or near room temperature, the formed bodies are still hot and near the temperature to which the particles were heated; and they are sent to a carbonizing chamber 13 while they are still hot and before they are permitted to cool, for it has been found that if the temperature of the formed material is permitted to drop very much between the forming and carbonizing or making step, undesirable cracks or flaws develop in the formed articles no matter how much care is employed in cooling and in re-heating them.

The overall cycle is such that the operation typically requires no more than about 2–3 minutes in heating the particles to a temperature between 300 and 525° C., or 325–470° C., press-forming them, and getting the formed articles into the carbonizer. During these phases of the process, no substantial "surges" are permitted in the cycle. In other words, the carbonaceous particles being heated or the formed carbonaceous masses being processed are kept moving very uniformly or regularly, with no substantial build-up being permitted. However, there may be "surges" in the preceding pre-heating (bringing the particles up to a given relatively low temperature such as around 250° C.) conditioning step, or (within limits) in the subsequent carbonizing step, without adverse, or as much adverse, effect upon the quality of the product produced, or the freedom from troubles of the process.

By closely following the process steps heretofore described, the press-formed bodies may be "rapidly" (e.g. much faster than the 18–24 hours typically required by the prior art methods) carbonized, such as to a temperature of between about 560° and about 1000° C. (or to a product VM content of 5% or less) within a period of eight hours maximum, without impairment of the qualities of the product. Carbonizing periods of from 1 to 4 hours are typical. Of course a longer period than these may also be employed, but it will usually be disadvantageous to do so.

Because the particles are heated to a rather high temperature (to some temperature within the temperature range of 300 to 525° C. depending upon the characteristics of the raw material(s) being processed, and/or the formulation, etc., as previously discussed), the formed green bodies usually do not re-soften and stick to each other, or deform upon being processed in the hot carbonizer 13; on the other hand because of the high temperatures to which the particles are heated in the high-temperature heating step, and their pressure forming at same, the bonds between the particles in the individual formed bodies are very good and the carbonized bodies produced are of superior strength. With certain formulations and under certain conditions, however, there is a tendency for the briquets to adhere to each other. If there is a tendency for the briquets to stick to each other during carbonization, they may be subjected to a brief surface oxidation to set and prevent re-softening of their surfaces during carbonization.

The formed green bodies may be carbonized in a rotary kiln, or in a shaft kiln, or on a moving grate, or in any suitable carbonizing apparatus which provides a substantially inert or non-oxidizing atmosphere. For best results, however, the carbonizing apparatus 13 is so constructed, or so regulated, that the formed green bodies can be raised to the desired final carbonizing temperature in a well regulated manner. In other words, if the desired final temperature is 800° C. and the formed green bodies are at a temperature of 400° C. when they leave the forming apparatus 10 and enter the carbonizer 13, they preferably will be heated from the 400° C. temperature to the 800° C. temperature at a very closely controlled upheat rate or upheat rates, such as at a rate not exceeding 400° C. per hour up to a temperature between about 500° C. and about 650° C., and then at a rate not exceeding 500° C. per hour up to the final 800° C. temperature. In other words, slower upheat rates are typically employed until the formed green bodies reach a critical temperature or until they are permanently "set" (typically 600–700° C.) after which somewhat faster upheat rates to the desired end temperature can be employed. The foregoing type of heating procedure must be employed rather than a heating procedure which would subject the hot formed bodies to a sharp or widespread temperature differential, such as from a temperature of 400° C. immediately to a temperature of 800° C. It is preferable, also, that the temperature of the formed bodies be increased substantially linearly within any given time interval. For example, this means proceeding fairly evenly at an upheat rate not exceeding about 10° C. per minute for any given minute during the initial upheat rate which does not exceed 400° C. for any given hour, and at an upheat rate not exceeding about 13° C. per minute for any given minute during the upheat rate which does not exceed 500° C. per hour, rather than heating the bodies, for example, for one hour at 500° C., then transferring them to a zone at 600° C. for another hour, etc.

Controlled temperature gradients which are more gentle than the foregoing such as not exceeding 300° C. for any given hour increment of time, or 8° C. for any given minute increment of time (for example, a baking rate of 3° C. per minute) are more typical or representative of those generally used in the carbonizing step. The particular upheat rate within the foregoing described ranges which will be chosen and employed will also be dependent upon the density, porosity, size, shape and VM content of the formed green bodies being processed.

Rotary kilns, shaft kilns and moving grates with gradually increasing temperature zones, as the formed bodies proceed through the carbonizer are very suitable for accomplishing the foregoing type of heating.

After the formed bodies are heated to the desired temperature, they are then gradually cooled in cooler 14 which provides an inert atmosphere until they reach a temperature of about 300° C. or lower. A single piece of apparatus, with heating zones and cooling zones, as shown in FIG. 2, may be employed for both carbonizing and cooling, or cooling may be accomplished in a separate piece of equipment. The cooled formed coke (which may be referred to as "formcoke") is then stored in product bin 15.

Heating and cooling of the solid raw materials and the formed coke is accomplished in accordance with FIG. 2 by heat transfer to circulating gases. The gas flow in FIG. 2 is as follows: Air and fuel are fed to combustion chamber 11 for start-up. After the plant is in operation fuel is supplied by the volatile matter present in the off gases from the carbonizer 13. The gases from combustion chamber 11 may be varied in temperature over the range 600 to 1500° C. and are held at essentially zero oxygen content. Excess gas may be vented to atmosphere from chamber 11. Gas from chamber 11 is passed directly to the carbonizer 13 where it is also mixed with inert gases from collector-cooler 17 used to cool the formcoke. The hot gases typically are fed into the carbonizer at a point where the formcoke or briquets approach the maximum temperature which they attain. The cool inert gas from 17 is typically fed into the cooler 14 near its bottom and this gas, of course, rises through the cooler and carbonizer as it is heated. Additional gas from combustion chamber 11 is tempered with cool inert gas obtained from gas cooler 16 and/or cyclone collector-cooler 17. A portion of this gas, at a temperature of 450 to 850° C., is used to heat the milled raw materials in duct 7. A portion of this gas is further diluted with cool gas from 17 so as to temper it to the range of 200 to 400° C. At this temperature it is supplied to mill 5 and used to preheat the milled raw material. Cooled low humidity gas is provided by passing exhaust gases from collector 8 to cooler 16 and cyclone-cooler 17. Hot gas from chamber 11 may also be provided to optional heater or soaker 12, and fed into said optional heater or soaker if one is employed at a number of spaced inlets.

Figure 3:
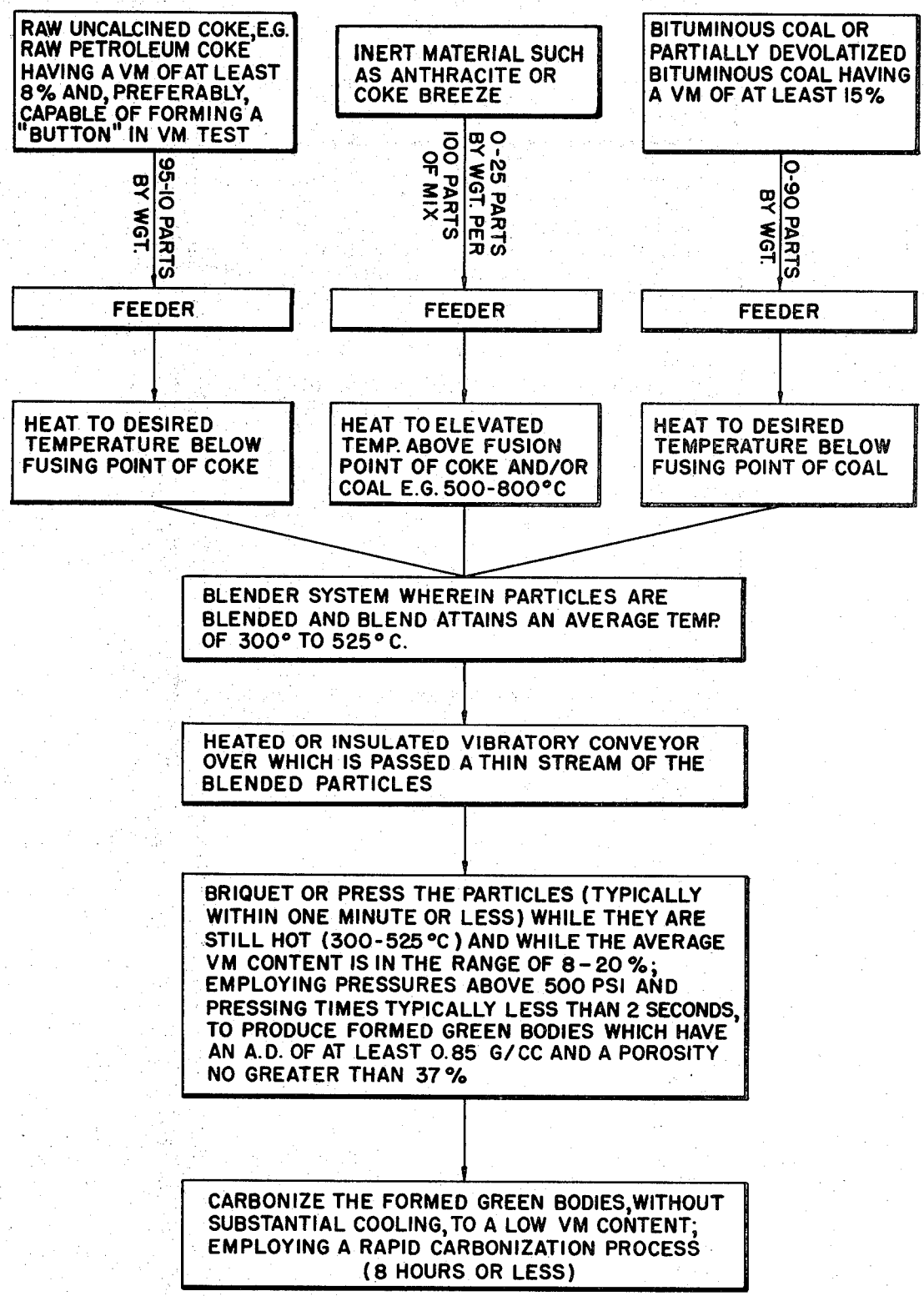

FIG. 3 is a block diagram illustrating a system for producing metallurgical coke briquets whereby separate heating of the individual components or blends of components can be employed. In the system illustrated, there are three separate feeder systems and three separate heating systems which permit separate heating of the three individual ingredients, for example, raw uncalcined or raw petroleum coke, bituminous coal, and the inert material. An alternative system which would employ separate heating of individual components or blends of components is one in which there are only two feeder systems and two heating systems provided. With such an arrangement, several alternatives are available such as to use one system for heating the inert and the other system for heating one of the active components, e.g. the raw uncalcined coke, or a blend of the active components. Yet another alternative is the situation in which no inert is employed, but where there is an appreciable difference between the fusion points of the two active components. In this instance, each active component is heated in a separate heating system. In these separate heating arrangements, the component with the higher fusion point is heated to the higher temperature and, in general, both or all components are heated to a temperature as close to their fusion temperature as possible while avoiding difficulty with agglomeration or excessive fusion in the heating system. Care is taken to provide substantially inert atmospheres so as to avoid excessive oxidation which is generally detrimental to fusibility of the particles and strength of the finished product.

The greatest advantage in using separate heating is obtained where an inert component is used; thus, in a typical operation the inert is heated separately and depending upon the type of unit, the blend of active materials is heated in a second heater system; or where three heating systems are available, the active components are also heated separately. The advantage of using an inert is that theoretically there is no limitation with respect to the temperature to which it may be heated without fusing, since by definition it is non-fusible. Thus, where separate heating systems are provided, advantage is taken of this by heating the inert to a temperature appreciably above that of the fusion point of the active ingredients, while the active ingredients are heated to as high a temperature as possible while avoiding difficulties due to fusion. The two (or three) heated streams are then quickly blended, thus transferring heat from the inert particles, which are at higher temperature, to the active particles at lower temperature. By providing the proper blending system the blend of the inert and active particles quickly comes to an equilibrium temperature above the fusion temperature of the active material(s) and at this temperature the mixture is readily briquettible to yield sound, green briquets which are then subjected to carbonization.

By utilizing separate heating systems a relatively wide choice of the methods of heating is possible since where an inert is used to supply heat, the active ingredients need not be heated above their fusion temperature in their respective heating systems. A critical step in utilizing separate heating systems and introducing heat by means of the inert or the higher heated ingredient to the ingredient(s) heated to a lower temperature lies in the method of blending the high temperature inert or ingredient with the active ingredient(s) which are at lower temperature. It is essential that the blending system quickly disperse the high temperature ingredient uniformly among the particles of the active ingredient(s). One system of blending which is of particular value when the ingredients are heated by dispersing them in a hot inert gas stream (such as illustrated in FIG. 2) is as follows:

The two or three streams of hot gases in which the ingredients are dispersed are carried in separate lines to a point just upstream of a cyclone collector. At the inlet of the cyclone collector the two or three streams are blended, for example, in a short line of pipe ahead of the cyclone inlet, or in the cyclone inlet itself. Almost immediately upon blending, the gas phase of this system reaches equilibrium; however, since the flow is directly into a cyclone, the solids are immediately separated from the gas and flow down the cone of the cyclone collector. By this method very intimate mixing of the two or three ingredients is obtained. It is apparent that where there is a reasonable proportion of inert it is not necessary to heat the inert to as high a temperature as where there is a lesser proportion of inert. Typically, 5 to 25 parts of inert are blended with 100 parts of active ingredients and the inert may typically be heated to temperatures in the range of 500 to 800° C.

Downstream of the collector cyclone, in the path of flow of the solids, a heated or insulated vibratory conveyor may be employed, just as in the arrangement illustrated in FIG. 2, over which a thin stream of the blended solids may be passed. The length of and retention time on this conveyor may be adjusted as required so as to provide sufficient time for the blend of the solids to approach equilibrium with respect to temperature so that satisfactory forming of the green briquets occurs. Substantially inert gas atmospheres are provided in both the collector cyclone and in the vibratory conveyor to avoid excessive oxidation of the particles. The use of such a vibratory conveyor, or moving grate or belt is optional (although preferred) in both this arrangement as well as in the arrangements of FIGS. 1 and 2.

Where a relatively high proportion of inert is employed, for example, 20 parts per hundred parts of active material, the temperature differential between the inert and the active material may be relatively low and in this instance the vibratory conveyor may not be necessary. Other means of conveying the blended solids from the collector cyclone may be employed. If desired, the cyclone may be fitted with a discharge screw such as also illustrated in FIG. 2. Likewise, the collected solids at the base of the cyclone may be carried by gravity, or a screw conveyor to a small hopper just above the briquetting press.

It is apparent that where a relatively small amount of inert is employed to introduce the same percentage of heat to the total particle system the inert must be heated to higher temperatures and in this instance the problem of mixing and transferring the heat from the inert to the active ingredients is more critical. Thus, to accomplish this, in addition to providing additional retention time after initial mixing, the inert may be milled to a particle size somewhat below that of the active particles but preferably free of extreme fines. Thus the inert particles may be more uniformly distributed among the active ingredient particles, appreciably reducing difficulties with the development of excessive temperature at the interface between the hot inert particles and the active ingredient particles.

As just pointed out, where heating is by entrainment in a gaseous medium, blending of the gas streams and separation of the solids from the blended gas streams provides a convenient means of obtaining a mix of the hot inert and the cooler active particles. However, means other than entrainment heating may also be employed. For example, two or three separate heaters, which may be directly or indirectly fired, of the rotary type and fitted with lifters may be used to heat the particles as they flow through the rotary unit and are contacted by the hot flue gases. The discharge from such a unit is a solid stream of heated particles and no elaborate equipment is required for separating the gases and solids as in entrainment heating. Thus the situation is such that there are two or three steams of solids which must be blended so as to permit the blend to approach the equilibrium temperature (e.g. between 300° C. and 525° C., and more preferably between 325° C. and 470° C.) necessary for satisfactory briquetting. One method for accomplishing this is to provide a small hopper which is insulated or heated to about the equilibrium temperature of the mix to be briquetted or to a temperature somewhat above this and to introduce into this hopper the two or three streams of solids. The hold-up time in this hopper is extremely small and its purpose is only to permit consolidation of the two or three solid streams and to direct them to the center point of a rotating horizontal disc, which also is maintained in the temperature range as indicated for the small hopper. Better distribution to the rotary disc is obtained by orbiting the hopper about the center point of the disc in a plane parallel to it. The particles upon landing on the rotating disc are immediately spread to a thin layer and by centrifugal force travel toward the edge of the disc, the disc being installed in a hopper of larger diameter, so that the particles which are traveling outward from the center of the disc are deflected downward below the disc by the surrounding walls of the hopper. The particles then flow down the walls of the hopper and accumulate within the hopper having been intimately mixed by their passage across the rotating disc and down the walls of the hopper.

It is apparent that this entire system must be maintained at an elevated temperature so as to prevent excessive heat loss from the individual particles or mix of the particles. It is also apparent that the speed of the rotating disc can be varied as required, depending upon the rate of feed to the disc and the retention time desired. The design of the system may also be varied depending upon the type of operation contemplated. For example, if it is desired to introduce a very large proportion of heat from the inert, which will require heating the inert to a high temperature, it may be desirable to provide more retention time in the layer of particles on the disc. It is also well to point out that, in general, the retention time of the smaller particles on the disc will be greater than the retention time of the larger particles, and this is a desirable situation provided the inert particles are finer, since in this instance the concentration of fine particles and their residence time on the disc will be greater than the average concentration of the active particles in the mix to be briquetted. The use of such a system provides considerable flexibility in permitting a rapid and intimate mixing of the hot inert particles and the relatively cooler active particles. The mixed particles in the base of the hopper containing the rotating disc are then fed to the briquet press and the briquets are then calcined in the same manner as illustrated and as discussed for the arrangements of FIGS. 1 and 2.

The following examples are set forth to further illustrate the invention:

EXAMPLE I

A dried, ground (100% minus ⅛ inch) well blended mixture of 90% petroleum coke having a VM of 13.6% and 10% of a non-caking coal having a VM of 41.7% was heated in a pre-heater in a manner as previously described in 3 minutes from 25° C. to 250° C. and then charged onto a vibrating tray in a thin layer where it was further heated to temperatures from 350° C. to 425° C. in 60 seconds, and then immediately pressed into briquets in a roll briquetting machine at a pressure (P) of approximately 15,000 p.s.i., where $P=F/A$ (A=total area of pockets under pressure along the line of contact between the rolls; F=force applied to the rolls of the press). The pressing time was less than a second. (The formed green briquets contained between 14.4 and 15.4% volatile matter.) Depending upon the temperature at which the briquets were pressed the properties of the carbonized briquets (carbonized in a manner such as previously discussed, to a temperature of 960° C. within about 8 hours) were as follows:

| Temperature of particles at briquetting (° C.) | Apparent density (g./cm.³) | Compressive strength (p.s.i.) |
|---|---|---|
| 350 | 1.37 | 4,700 |
| 395 | 1.48 | 9,400 |
| 425 | 1.48 | 3,600 |

This example shows that, for a given system, the apparent density of the product and/or its strength may be controlled, or values desired obtained, by varying the temperatures at which the particles are briquetted.

EXAMPLE II

The mixture of Example I was heated as described in that example but the temperature of the particles a briquetting was kept constant at 395° C., and only the briquetting pressure was changed. The effect of briquetting pressure as it was changed from 500 to 4000 p.s.i., using a piston type press, on the properties of the carbonized briquets was as follows:

| Briquetting pressure (p.s.i.) | Apparent density (g./cm.³) | | Compressive strength (p.s.i.) |
|---|---|---|---|
| | Green | Carbonized | |
| 500 | 0.99 | 1.20 | 1,100 |
| 1,000 | 1.13 | 1.39 | 6,100 |
| 1,500 | 1.18 | 1.44 | 8,500 |
| 2,000 | 1.18 | 1.46 | 9,400 |
| 2,500 | 1.20 | 1.46 | 9,600 |
| 3,000 | 1.19 | 1.46 | 8,500 |
| 3,500 | 1.19 | 1.46 | 8,500 |
| 4,000 | 1.19 | 1.46 | 7,000 |

For this formulation, maximum tumbler values were attained at pressures of 1500 p.s.i. At pressures of 2500 p.s.i. fissures first appeared in the green briquets. As pressures increased, the fissuring became more pronounced and this led to progressively poorer tumbler values. This example shows that excessive pressures can lead to deterioration in briquet quality. Optimum pressure varies with mix formulation and temperature of pressing. The use of presures in excess of about 4000 p.s.i. when using a piston press is uneconomical and for most formulations contemplated in this invention leads to poorer quality final product than if lower pressures are used.

EXAMPLE III

Additional runs were carried out as in Example I but using different coals (10 wt. percent) with the same petroleum coke (90 wt. percent) which had a VM of 13.6%. The briquetting temperature and pressure employed in each case were 385° C. and 15,000 p.s.i. The effect of different coals on the properties of the carbonized briquets were as follows:

| Coal | | Apparent density (g./cm.³) | | Compressive strength (p.s.i.) |
|---|---|---|---|---|
| Source | Percent VM | Green | Carbonized | |
| Timtony | 26.1 | 1.16 | 1.47 | 8,000 |
| River King | 41.1 | 1.15 | 1.50 | 8,600 |
| Pocahontas | 16 | 1.21 | 1.46 | 8,300 |
| Wilmington | 41.7 | 1.19 | 1.49 | 7,000 |

This example shows that the volatile matter content of the coal may vary over a wide range such as between about 15% and about 45%, and satisfactory or good products still be obtained. Because of the low percentage of coal in the formulation, devolatilization of the coal was unnecessary prior to mixing.

EXAMPLE IV

Formed green bodies of Example I, which had been briquetted at 395° C., were baked or carbonized to different final baking temperatures at a rate of 3° C./min. The effect of the final baking temperature which is employed on the properties of the bodies is typified by the following:

| Carbonizing conditions | | Apparent density (g./cm.³) | Compressive strength (p.s.i.) |
|---|---|---|---|
| Time, (minutes) | Final temp. (° C.) | | |
| 55 | 560 | 1.13 | 1,400 |
| 88 | 660 | 1.16 | 4,200 |
| 122 | 760 | 1.27 | 4,700 |
| 155 | 860 | 1.38 | 5,000 |
| 188 | 960 | 1.49 | 5,500 |

This example shows that, generally, carbonizing temperatures at least as high as 560° C. are required and that baking temperatures higher than this such as at 860°–960° C. are to be preferred for optimum properties. Temperatures higher than 960° C. may also be employed but will generally not be required in order to make a satisfactory commercial product. The example also shows that baking times of 4 hours or less are effective in producing bodies having very satisfactory properties. As previously discussed, faster heating rates than the 3° C./minute specified in the example may also sometimes be employed, depending in part upon the formulation, the size and shape of the green bodies, etc.

The briquets produced in Example I were pillow shaped and were 3 inches long, 2 inches wide and possessed a maximum thickness of 1½ inches; it should, however, be appreciated that the green bodies of this invention can have other shapes such as semi-cylindrical, or tubular, or doughnut-shaped, etc.; depending in large part upon the necessity or desirability of producing porosity in the packed bed of the furnace in which they are used. Such alternative shapes may also readily be resorted to in order to facilitate rapid evolution of volatiles in the baking step and hence a rapid carbonizing step and, at the same time, the minimization of flaws, or cracks or spalling, etc., during the baking step. Generally, however, the formed green bodies of the invention will be so shaped that at least one of its dimensions does not exceed about 2 inches.

In the foregoing examples, also, the calculated VM content of the 90–10 petroleum coke-coal mixtures was 16.4%, with the mixtures losing 1–2% VM during the upheat of the particles in the pre-heater and in the vibrator oven tray.

The following examples illustrate other processing techniques and formulations, as well as experimental data and results, which are within the scope of the invention:

EXAMPLE V

Using a charge of 50% petroleum coke having a VM of 13.6% and 50% coal having a VM of 22.2%, a number of briquets were made utilizing a briquetting pressure of 15,000 p.s.i., a carbonizing rate of 3.0° C./minute to 960° C. and briquetting temperatures varying from 310° C. to 390° C. The results obtained were as follows:

| Briquetting temp., ° C. | Apparent density, g./cc. | | Relative tumbler values |
|---|---|---|---|
| | Green | Carbonized | |
| 310 | 1.08 | 1.09 | 74 |
| 330 | 1.10 | 1.15 | 74 |
| 350 | 1.11 | 1.17 | 84.8 |
| 370 | 1.14 | 1.29 | 82.5 |
| 390 | 1.18 | 1.08 | 94.5 |

It is of interest to note that for this example maximum tumbler value corresponds to maximum temperature of forming while maximum apparent density of the finished coke occurs at a lower briquetting temperature.

EXAMPLE VI

Using a charge of 40% petroleum coke having a VM of 14.0% and 60% partially devolatilized coal having a VM of 23% (the raw coal had a VM content of 37.5% prior to devolatilization) a number of briquets were made utilizing a briquetting pressure of 15,000 p.s.i., a carbonizing rate of 3.0° C./minute to 960° C. and briquetting temperatures varying from 330 to 390° C. The results obtained were as follows:

| Briquetting temp., ° C. | Apparent density, g./cc. | | Relative tumbler values |
|---|---|---|---|
| | Green | Carbonized | |
| 330 | 1.06 | 0.89 | 95.8 |
| 360 | 1.09 | 0.93 | 100 |
| 390 | 1.19 | 1.10 | 75.5 |

As in Example V, maximum tumbler does not coincide with maximum density of the finished coke.

EXAMPLE VII

Using a charge of 20% petroleum coke having a VM of 13.6% and 80% coal having a VM of 22.2%, a number of briquets were made utilizing a briquetting pressure of 15,000 p.s.i., a carbonizing rate of 3.0° C./minute to 960° C. and briquetting temperatures varying from 330° C. to 390° C. The results obtained were as follows:

| Briquetting temp., ° C. | Apparent density, g./cc. | | Relative tumbler values |
|---|---|---|---|
| | Green | Carbonized | |
| 330 | 1.07 | 0.92 | 25.5 |
| 360 | 1.07 | 0.80 | 46.4 |
| 390 | 1.13 | 0.81 | 51.0 |

Significant reduction in tumbler values and carbonized densities of formed coke produced with 20% petroleum coke is apparent when comparing this example with Example VI which utilized 40% petroleum coke. Because of this, ten percent raw uncalcined coke is considered a minimum for the process of this invention and the production of coke having reasonably good properties, and the use of at least twenty percent is more typical and preferred.

EXAMPLE VIII

Using a charge of 60% petroleum coke having a VM of 14% and 40% coal having a VM of 27%, a number of briquets were made utilizing a briquetting pressure of 15,000 p.s.i., a carbonizing rate of 3.0° C./minute to 960° C. and briquetting temperatures varying from 310° C. to 410° C. The results obtained were as follows:

| Briquetting temp., ° C. | Apparent density, g./cc. | | Relative tumbler values |
|---|---|---|---|
| | Green | Carbonized | |
| 310 | 1.106 | 1.201 | 54.6 |
| 330 | 1.095 | 1.158 | 91 |
| 350 | 1.116 | 1.183 | 94 |
| 370 | 1.128 | 1.178 | 97.3 |
| 390 | 1.173 | 1.245 | 93.2 |
| 410 | 0.941 | 1.207 | 86 |

At 60% petroleum coke and 40% coal higher tumbler values were obtained over a density range of 1.16 to 1.25.

EXAMPLE IX

Using a charge of 70% petroleum coke having a VM of 13% and 30% coal having a VM of 31%, a number of briquets were made utilizing a briquetting pressure of 15,000 p.s.i., a carbonizing rate of 3.0° C./minute to 960° C. and briquetting temperatures varying from 310° C. to 410° C. The results obtained were as follows:

| Briquetting temp., ° C. | Apparent density, g./cc. | | Relative tumbler values |
|---|---|---|---|
| | Green | Carbonized | |
| 310 | 1.116 | 1.290 | 83 |
| 330 | 1.140 | 1.230 | 97.9 |
| 350 | 1.157 | 1.250 | 96 |
| 370 | 1.190 | 1.271 | 97.3 |
| 390 | 1.165 | 1.299 | 89.8 |
| 410 | 1.081 | 1.262 | 95 |

Using the foregoing mixtures, higher tumbler values and high apparent densities were obtained over the entire temperature range investigated.

EXAMPLE X

Using a charge of 80% petroleum coke having a VM of 15% and 20% coal having a VM of 24%, a number of briquets were made utilizing a briquetting pressure of 15,000 p.s.i., a carbonizing rate of 3.0° C./minute to 960° C. and briquetting temperatures varying from 310° C. to 410° C. The results obtained were as follows:

| Briquetting temp., ° C. | Apparent density g./cc. | | Relative tumbler values |
|---|---|---|---|
| | Green | Carbonized | |
| 310 | 1.126 | 1.296 | 95.8 |
| 330 | 1.142 | 1.30 | 92.6 |
| 350 | 1.165 | 1.320 | 96.8 |
| 370 | 1.180 | 1.293 | 100 |
| 390 | 1.130 | 1.316 | 100 |
| 410 | 1.200 | 1.303 | 95.9 |

Similar conclusions were drawn for this example as for Example IX.

EXAMPLE XI

Using a charge of 90% petroleum coke having a VM of 13% and 10% coal having a VM of 23%, a number of briquets were made utilizing a briquetting pressure of 15,000 p.s.i., a carbonizing rate of 3.0° C./minute to 960° C. and briquetting temperatures varying from 310° C. to 410° C. The results obtained were as follows:

| Briquetting temp., ° C. | Apparent density g./cc. | | Relative tumbler values |
|---|---|---|---|
| | Green | Carbonized | |
| 310 | 1.14 | 1.35 | 93.7 |
| 330 | 1.15 | 1.36 | 83.7 |
| 350 | 1.17 | 1.39 | 93 |
| 370 | 1.175 | 1.41 | 86 |
| 390 | 1.18 | 1.42 | 92.5 |
| 410 | 1.19 | 1.40 | 86.8 |

Using 15,000 p.s.i. and briquetting temperatures over the range of 310–410° C., the blend of 90% petroleum coke and 10% coal yielded the highest density coke with good tumbler values.

EXAMPLE XII

Briquets were also made using a charge of 100% of petroleum coke having a VM of 12% and utilizing a briquetting pressure of 15,000 p.s.i., a carbonizing rate of 3° C./minute to 960° C. and a briquetting temperature of 470° C. The results obtained were as follows.

Briquetting temp., ° C. _____ 470
Apparent density, g./cc.:
  Green _____ 1.19
  Carbonized _____ 1.48
Relative tumbler value _____ 50.5

Additional runs were made with the same formulation as in Example I or using other formulations, and using minimum and maximum temperatures in the preheater of 230° C. and 280° C., with 250° C. showing preferred results. Minimum and maximum temperatures of 300° C. and 525° C. were also employed on the vibrator oven tray in conjunction with various formulations within the scope of the invention. The higher-heating step was also carried out using the same minimum and maximum temperatures of 300° C. and 525° C. with the inert gas stream conduit-cyclone arrangements previously described. For most systems and/or formulations, temperatures of about 395° C. or between 325° and 470° C. (mean or average temperature of the particles at time of briquetting or pressure-forming), were found to give best or optimum results.

The utility of the process variation of separate heating of the inert and/or of the individual active ingredients, or their mixture, is illustrated in the following examples:

EXAMPLE XIII

To permit satisfactory briquetting of a mixture of 40 parts of raw petroleum coke, 60 parts bituminous coal and 15 parts of inert, it was found necessary to heat the mix to an average temperature of 325° C. The petroleum coke and coal used were those described in Example V and were of a particle size of 100% minus ⅛ inch. The inert used was anthracite having a VM of 8% and a particle size of 100% minus ⅛ inch and 50% minus 100 mesh Tyler. To accomplish this, the 40 parts petroleum coke and 60 parts bituminous coal were blended cold and then heated as a mixture to about 282° C., appreciably below the fusion point of either of the components of this mixture. Simultaneously, the inert anthracite material was separately heated to a temperature of 700° C. The anthracite, at 700° C., was then blended, by means of the entrainment heating system previously discussed, with the mixture of active ingredients at 282° C. to yield the final blend of 100 parts active ingredients, 15 parts inert, at a temperature of about 325° C. Theoretically, the mix temperature should have been 330° C., assuming no loss of heat. The mix at 325° C. was then fed to the briquetting press operated at a pressure of 20,000 p.s.i., to yield green briquets and these were subsequently calcined in a manner as already discussed to yield briquets with the following properties:

Apparent density (g./cm.³) _____ 1.18
Compressive strength (p.s.i.) _____ 3500
Relative tumbler value _____ 70

It is apparent that the temperature to which the inert material must be heated for a given situation is dependent not only upon the relative amounts of the ingredients and the temperature to which they are heated, but also on the specific heat of the inert as compared with the specific heat of the active ingredient or mixture of active ingredients. In general, however, most of the materials contemplated for use in this process have specific heats of about 0.3.

EXAMPLE XIV

Using two direct fired rotary heaters, fitted with lifters, 1000 lbs./hr. of raw petroleum coke, having a volatile matter content of 12% and a particle size of 100% minus ⅛ inch and 50% minus 100 mesh Tyler was heated to a temperature of 436° C. In a parallel unit 200 lbs./hr. of anthracite of the same particle size and having a VM of 8% was heated to a temperature of 700° C. The two streams of solids from these rotary heaters were then passed to a spinning disc type mixer such as previously described. The stream of mixed solids from the base of the mixer was at a temperature of 480° C. and was fed by means of a vibrating heated conveyor to an insulated hopper above the roll briquet press operated at a roll pressure of 22,000 p.s.i. The green briquets produced in this operation had an apparent density of 1.15. These were subsequently carbonized to a mix temperature of 900° C. over a 4 hour period to yield briquets having an apparent density of 1.4 gms./cc. and a relative tumbler value of 47.

Additional tests were carried out using the raw coke, coal and inert and three separate feeders and heaters and blending techniques as already described. Carbonized briquets having properties satisfactory for those uses hereindiscussed were obtained.

The following example is set forth to illustrate some additional processing variations.

EXAMPLE XV

Using a charge of 40% petroleum coke having a VM of 13.4% and 60% coal having a VM of 22.4%, a number of briquets were made utilizing a briquetting pressure of 19,700 p.s.i. and a briquetting temperature of 440° C. These briquets were carbonized in a manner as previously discussed. The calculated VM content of the mix prior to the 440° C. heating step was 18.6%. The VM content of the green briquets was 15% and the VM content of the briquets after being calcined was 1.67%. The green briquets had an apparent density of 1.06 g./cc. and the calcined briquets had an apparent density of 1.20 g./cc. The green briquets were slightly oxidized after pressing and before being calcined and there was no fusion in the carbonizing step. The calcined briquets possessed excellent relative tumbler values.

The volatile matter (VM) content of the raw cokes and coals of this invention are determined in accordance with the A.S.T.M. Procedure No. D271–48 as modified for peat and lignite, and being exclusive of water. In accordance with this procedure, a relatively small sample of the raw coke or coal is heated at 950° C. for a period of time between about 5 to 10 minutes. The difference in weight of the sample prior to and after heating constitutes the "volatile content" of the material tested. As previously stated, it is preferable that the raw cokes employed in the invention not only have the specified VM content of between about 8 and about 20% and more typically between about 11 and about 16% when used with coal, or of at least about 10% when used alone, but that they also form a "button," i.e. a hard, coke agglomerate while being heated in accordance with the previously mentioned A.S.T.M. procedure, except that a 5 gram sample instead of a 1 gram sample is used. This latter property is essential when the raw coke is employed as the sole active ingredient.

Having thus described the nature of our invention and the uses for the product of our invention, but being limited only by the appended claims with respect to the scope of the invention, we claim:

1. A process of manufacturing metallurgical coke which comprises:
   (a) preparing a final blend for briquetting with a composition consisting of from 10 to 95 parts by weight of fusible raw uncalcined coke particles having a volatile matter content of at least 8% and from 90 to 5 parts by weight of bituminous coal particles having a volatile matter content of at least 15%, totaling 100 parts of active ingredients, and from 25 to 0 parts by weight of particles of a solid inert material, per 100 parts of active materials, the average volatile matter content of the coal and raw coke particles taken together not exceeding about 20%;
   (b) rendering said blend of particles in a plastic condition by heating them uniformly and rapidly in a substantially inert gas system to a temperature between about 300° C. and about 525° C. and to or above that at which they readily agglomerate while simultaneously maintaining them in a relatively thin stream so as to prevent any excessive agglomeration between the particles from occurring; said particles being maintained in the relatively thin stream while they are heated in this step by a technique selected from the following or a combination thereof:
   (1) by entrainment heating of the particles wherein they are diluted in a heated, inert gas stream or carrier gas in a suitably insulated metal or ceramic pipe or chamber; and
   (2) by heating the particles in a thin stream or in suitably thin layers in a heat soaker such as a vibrating tray or conveyor, or a moving grate or belt;
   (c) compressing the hot particles from (b) in a substantially inert gas system to form a green body of the desired shape while the particles are still at a temperature between about 300° C. and about 525° C. and while their average volatile matter content is still about 8% and below about 20%, utilizing a forming pressure above about 500 p.s.i. to produce a green body having a porosity no greater than 37% and an apparent density of at least 0.85 g./cc.; and
   (d) further heating the formed green bodies in a substantially inert gas system, while the bodies are still hot, by raising their temperature with a gradual upheat rate to a temperature between about 560° C. and 1000° C. to reduce their volatile matter content.

2. A process according to claim 1 wherein the raw coke is raw petroleum coke from a delayed coker, and wherein said raw petroleum coke particles are further characterized by forming a hard, agglomerated coke when a 5 gram sample of same is heated at 950° C. for a period of time between about 5 to 10 minutes.

3. A process according to claim 1 wherein, in a separate step, the blend of particles from step (a) is preheated over any convenient period of time to a conditioning temperature exceeding about 200° C. but below the temperature at which the particles readily agglomerate, before they are rapidly heated to the temperature between about 300° C. and about 525° C.

4. A process of manufacturing metallurgical coke which comprises:
   (a) preparing a final blend for briquetting with a composition consisting of from 20 to 95 parts by weight of fusible raw uncalcined coke particles having a volatile matter content of at least 8% and from 80 to 5 parts by weight of bituminous coal particles having a volatile matter content of at least 15%, totaling 100 parts of active ingredients, and from 25 to 0 parts by weight of particles of a solid inert material, per 100 parts of active materials, the average volatile matter content of the coal and raw coke particles taken together not exceeding about 20%;
   (b) rendering said blend of particles in a plastic condition by heating them uniformly and rapidly in a substantially inert gas system to a temperature between about 300° C. and about 525° C. and to or above that at which they readily agglomerate while simultaneously maintaining them in a relatively thin stream so as to prevent any excessive agglomeration between the particles from occurring;
   (c) compressing the hot particles from (b) in a substantially inert gas system to form a green body of the desired shape while the particles are still at a temperature between about 300° C. and about 525° C. and while their average volatile matter content is still about 8% and below about 20%, utilizing a forming pressure above about 500 p.s.i. to produce a green body having a porosity no greater than 37% and an apparent density of at least 0.85 g./cc.; and
   (d) further heating the formed green bodies in a substantially inert gas system, while the bodies are still hot, by raising their temperature with a gradual upheat rate to a temperature between about 560° C. and 1000° C. to reduce their volatile matter content.

5. A process of manufacturing metallurgical coke from a starting material consisting of 100% of raw, uncalcined coke particles, said coke being fusible and having a volatile matter content of at least 10% but below about 20%, which consists essentially of:
   (a) rendering said raw coke particles in a plastic condition by heating them uniformly and rapidly in a substantially inert gas system to a temperature between about 300° C. and about 525° C. and to or above that at which they readily agglomerate while simultaneously maintaining them in a relatively thin stream so as to prevent any excessive agglomeration between the particles from occurring, said raw coke particles being further characterized by forming a hard, agglomerated coke when a 5 gram sample of same is heated at 950° C. for a period of time between about 5 to 10 minutes;

(b) compressing the hot particles from (a) in a substantially inert gas system to form a green body of the desired shape while the particles are still at a temperature between about 300° C. and about 525° C. and while their average volatile matter content is still above 8% and below about 20%, utilizing a forming pressure above about 500 p.s.i. to produce a green body having a porosity no greater than 37% and an apparent density of at least 0.85 g./cc.; and (c) further heating the formed green bodies in a substantially inert gas system, while the bodies are still hot, by raising their temperature with a gradual upheat rate to a temperature between about 560° C. and 1000° C. to reduce their volatile matter content.

6. A process according to claim 5 wherein the particles are compressed by means of a roll briquetting operation employing a pressing time of no more than two seconds.

7. A process according to claim 5 wherein the raw coke particles are maintained in a relatively thin stream while they are heated in step (a) by a technique selected from the following or a combination thereof:

(a) by entrainment heating of the particles wherein they are diluted in a heated, inert gas system or carrier gas in a suitably insulated metal or ceramic pipe or chamber; and (b) by heating the particles in a thin stream or in suitably thin layers in a heat soaker such as a vibrating tray or conveyor, or a moving grate or belt.

8. A process of manufacturing metallurgical coke from ingredients consisting essentially of from 10 to 95 parts by weight of fusible raw uncalcined coke particles having a volatile matter content of at least 8%, from 90 to 0 parts by weight of bituminous coal particles having a volatile matter content of at least 15%, these constituting the active ingredients, and from 25 to 0 parts by weight of particles of a solid inert material, per 100 parts of active ingredients, the average volatile matter content of the coal and raw coke particles taken together not exceeding about 20%, and at least two of the foregoing three ingredients being used in the making of the coke which comprises:

(a) rendering said particles in a plastic condition by heating them to an average temperature between about 300° C. and about 525° C. and to or above that at which they readily agglomerate when mixed by blending the particles into a substantially uniform mixture after heating at least one of the ingredients separately from and to a different temperature than the the remaining ingredient or ingredients, while simultaneously maintaining the blended particles in a relatively thin stream so as to prevent any excessive agglomeration between the blended particles from occurring, having avoided excessive oxidation by the use of substantially inert gas atmospheres; said particles being maintained in the relatively thin stream after they have been heated, and while or after being blended, but before being compressed in step (b), by a technique selected from the following or a combination thereof:

(1) by entrainment heating wherein the separately heated ingredients are blended in a short line of pipe ahead of the inlet to a cyclone collector or at the inlet itself;

(2) by a discharge screw within the cyclone if entrainment heating and a cyclone collector are used;

(3) by a heat soaker such as a vibrating tray or conveyor, or a moving grate or belt; and (4) by a hopper or collector and a rotating disc wherein the hopper consolidates solid streams of the ingredients and directs them to the rotating disc whereon the particles are spread to a thin layer and by centrifugal force travel toward the edge of the disc;

(b) compressing the hot particles from (a) in a substantially inert gas system to form a green body of the desired shape while the particles are still at a temperature between about 300° C. and about 525° C. and while their average volatile matter content is still above about 8% and below about 20%, utilizing a forming pressure above about 500 p.s.i. to produce a green body having a porosity no greater than 37% and an apparent density of at least 0.85 g./cc.; and (c) further heating the formed green bodies in a substantially inert gas system, while the bodies are still hot, by raising their temperaure with a gradual upheat rate to a temperature between about 560° C. and 1000° C. to reduce their volatile matter content.

9. A process according to claim 8 wherein at least about 5 parts of inert particles are employed and wherein the inert ingredient is heated in step (a) to a substantially higher temperature than the remaining ingredient or ingredients.

10. A process according to claim 8 wherein three ingredients, coke, coal and inert are employed and wherein each of the three ingredients is separately heated in step (a) before they are blended, the inert ingredient being heated to a substantially higher temperature than either the coke or the coal.

11. A process of manufacturing metallurgical coke from ingredients consisting essentially of from 20 to 95 parts by weight of fusible raw uncalcined coke particles having a volatile matter content of at least 8%, from 80 to 0 parts by weight of bituminous coal particles having a volatile matter content of at least 15%, these constituting the active ingredients, and from 25 to 0 parts by weight of particles of a solid inert material, per 100 parts of active ingredients, the average volatile matter content of the coal and raw coke particles taken together not exceeding about 20%, and at least two of the foregoing three ingredients being used in the making of the coke which comprises:

(a) rendering said particles in a plastic condition by heating them to an average temperature between about 300° C. and about 525° C. and to or above that at which they readily agglomerate when mixed by blending the particles into a substantially uniform mixture after heating at least one of the ingredients separately from and to a different temperature than the remaining ingredient or ingredients, while simultaneously maintaining the blended particles in a relatively thin stream so as to prevent any excessive agglomeration between the blended particles from occurring, having avoided excessive oxidation by the use of substantially inert gas atmospheres;

(b) compressing the hot particles from (a) in a substantially inert gas system to form a green body of the desired shape while the particles are still at a temperature between about 300° C. and about 525° C. and while their average volatile matter content is still above about 8% and below about 20%, utilizing a forming pressure above about 500 p.s.i. to produce a green body having a porosity no greater than 37% and an apparent density of at least 0.85 g./cc.; and (c) further heating the formed green bodies in a substantially inert gas system, while the bodies are still hot, by raising their temperature with a gradual upheat rate to a temperature between about 560° C. and 1000° C. to reduce their volatile matter content.

12. A process of manufacturing metallurgical coke from a starting material which consists of a blend of 100 parts of fusible raw petroleum coke particles, having a volatile matter content of at least 10%, up to 5 parts, by weight of the raw petroleum coke, of bituminous coal particles having a volatile matter content of at least 15%, and up to 25 parts, by weight of the raw petroleum coke, of particles of a solid inert material, with at least one ingredient in addition to the raw coke being employed, the average volatile matter content of the coal and raw coke particles taken together not exceeding about 20%, which consists essentially of:

(a) rendering said blend of particles in a plastic condition by heating them uniformly and rapidly in a substantially inert gas system to a temperature between about 300° C. and about 525° C. and to or above that at which they readily agglomerate while simultaneously maintaining them in a relatively thin stream so as to prevent any excessive agglomeration between the particles from occurring, said raw petroleum coke particles being further characterized by forming a hard, agglomerated coke when a 5 gram sample of same is heated at 950° C. for a period of time between about 5 to 10 minutes;

(b) compressing the hot particles from (a) in a substantially inert gas system to form a green body of the desired shape while the particles are still at a temperature between about 300° C and about 525° C. and while their average volatile matter content is still above 8% and below about 20%, utilizing a forming pressure above about 500 p.s.i. to produce a green body having a porosity no greater than 37% and an apparent density of at least 0.85 g./cc.; and (c) further heating the formed green bodies in a substantially inert gas system, while the bodies are still hot, by raising their temperature with a gradual upheat rate to a temperature between about 560° C. and 1000° C. to reduce their volatile matter content.

13. A process according to claim 12 wherein the blend of particles is maintained in a relatively thin stream while they are heated in step (a) by a technique selected from the following or a combination thereof:

(a) by entrainment heating of the particles wherein they are diluted in a heated, inert gas stream or carrier gas in a suitably insulated metal or ceramic pipe or chamber; and (b) by heating the particles in a thin stream or in suitably thin layers in a heat soaker such as a vibrating tray or conveyor, or a moving grate or belt.

References Cited
UNITED STATES PATENTS

| | | |
|---|---|---|
| 1,772,053 | 8/1930 | McIntire. |
| 1,903,237 | 3/1933 | Johnston. |
| 1,948,471 | 2/1934 | Loebell et al. |
| 3,018,226 | 1/1962 | Batchelor et al. |
| 3,316,155 | 4/1967 | Holowaty et al. |

WILBUR L. BASCOMB, Jr., Primary Examiner

D. EDWARDS, Assistant Examiner

U.S. Cl. X.R.:

201—9, 22; 264—29